US012732783B2

(12) United States Patent
Exner et al.

(10) Patent No.: US 12,732,783 B2
(45) Date of Patent: Sep. 8, 2026

(54) CONTROLLING ELECTRONIC DEVICES BY AERIAL VEHICLES

(71) Applicant: Sony Group Corporation, Tokyo (JP)

(72) Inventors: Peter Exner, Malmö (SE); Hannes Bergkvist, Rydeback (SE)

(73) Assignee: Sony Group Corporation, Tokyo (JP)

( * ) Notice: Subject to any disclaimer, the term of this patent is extended or adjusted under 35 U.S.C. 154(b) by 310 days.

(21) Appl. No.: 18/568,080

(22) PCT Filed: May 11, 2022

(86) PCT No.: PCT/EP2022/062862

§ 371 (c)(1),
(2) Date: Dec. 7, 2023

(87) PCT Pub. No.: WO2023/280457

PCT Pub. Date: Jan. 12, 2023

(65) Prior Publication Data

US 2024/0276186 A1 Aug. 15, 2024

(30) Foreign Application Priority Data

Jul. 7, 2021 (SE) .................................... 2150904-7

(51) Int. Cl.
*H04W 4/38* (2018.01)
*B64U 10/13* (2023.01)
*H04W 4/40* (2018.01)

(52) U.S. Cl.
CPC .............. *H04W 4/38* (2018.02); *B64U 10/13* (2023.01); *H04W 4/40* (2018.02); *B64U 2201/00* (2023.01)

(58) Field of Classification Search
CPC ........... H04W 4/38; H04W 4/40; H04W 4/42; H04W 12/72; B64U 10/13;
(Continued)

(56) References Cited

U.S. PATENT DOCUMENTS 9,275,645 B2 3/2016 Hearing
9,949,450 B2 4/2018 Richings, Sr.
(Continued)

FOREIGN PATENT DOCUMENTS

WO 2020109440 A1 6/2020

OTHER PUBLICATIONS

International Search Report and Written Opinion from corresponding International Application No. PCT/EP2022/062862, mailed on Sep. 8, 2022, 10 pages.

(Continued)

*Primary Examiner* — Maceeh Anwari
(74) *Attorney, Agent, or Firm* — Tucker Ellis LLP

(57) ABSTRACT

An electronic device comprises a sensor arrangement, a control system operable to obtain sensor data from the sensor arrangement, and a microphone configured to provide an audio signal representing sound waves received by the microphone. The control system processes (102) the audio signal for detection of an audio characteristic feature, ACF, representing an operating parameter of a propulsion system in an aerial vehicle, and, upon said detection, performs (104) a dedicated action related to the sensor data. The dedicated action may comprise obtaining and/or transmitting at least part of the sensor data. To control the electronic device, the aerial vehicle is configured to, intermittently while on a flight path, cause its propulsion system (22) to impart a predefined and audible modification of an operating parameter of the propulsion system (22) to thereby generate sound waves that include the ACF.

18 Claims, 5 Drawing Sheets

(58) Field of Classification Search
CPC ................ B64U 2201/00; B64U 30/20; B64U 2101/20; G08G 5/57; G08G 5/22; G08G 5/55; G08G 5/727
USPC .............................................................. 701/3
See application file for complete search history.

(56) References Cited

U.S. PATENT DOCUMENTS

| | | | | |
|---|---|---|---|---|
| 10,181,332 | B1 | 1/2019 | Laag | |
| 10,659,144 | B1 | 5/2020 | Tofighbakhsh | |
| 10,728,336 | B2 | 7/2020 | Akhtar | |
| 2014/0024313 | A1 | 1/2014 | Campbell | |
| 2015/0302858 | A1 | 10/2015 | Hearing | |
| 2017/0234724 | A1 | 8/2017 | Naguib | |
| 2018/0091908 | A1 | 3/2018 | Goel | |
| 2019/0035288 | A1 | 1/2019 | Beltman | |
| 2020/0354056 | A1* | 11/2020 | Borras | H04L 67/141 |

OTHER PUBLICATIONS

Office Action and Swedish Search Report from corresponding Swedish Application No. 2150904-7, mailed on Mar. 11, 2022, 7 pages.

* cited by examiner

104

131 RETRIEVE SENSOR DATA FROM MEMORY

132 TRANSMIT SENSOR DATA

141 DETERMINE SELECTED SUBSET OF SENSOR DATA

142 RETRIEVE SELECTED SUBSET FROM MEMORY

143 TRANSMIT SELECTED SUBSET

151 OBTAIN (SELECTED) SENSOR DATA FROM SENSOR ARRANGEMENT

152 STORE (SELECTED) SENSOR DATA

161 OBTAIN (SELECTED) SENSOR DATA FROM SENSOR ARRANGEMENT

162 TRANSMIT (SELECTED) SENSOR DATA

CONTROLLING ELECTRONIC DEVICES BY AERIAL VEHICLES

TECHNICAL FIELD

The present disclosure relates generally to electronic devices that are associated with sensors and, in particular, to techniques of controlling such electronic devices by use of aerial vehicles.

BACKGROUND ART

Electronic devices provided with sensors are becoming more and more common, partly driven by the proliferation of Internet of Things (IoT) devices. In some applications, these electronic devices, or "smart sensing devices", are distributed across a large area. The sensor data measured by the respective smart sensing device is collected at a central site to monitor, online or offline, the status of one or more sensor parameters measured by the smart sensing devices across the large area. Examples of such applications include agriculture, smart cities, wildlife research, environmental research, healthcare, energy consumption monitoring, security monitoring, etc.

The smart sensing devices are typically battery powered and provided in large numbers. The cost for replacement of batteries or smart sensing devices is high in terms of labor, and the smart sensing devices are therefore configured to minimize power consumption.

The smart sensing devices may transmit their sensor data by wireless transmission. It has been proposed to use aerial vehicles, such as drones, for gathering sensor data by interception of wireless signals transmitted by the smart sensing devices. For example, the smart sensing devices may be configured to measure and transmit sensor data in accordance with a predefined schedule. One problem with this approach is that the arrival of the drone needs to be timed with the predefined schedule. To reduce the need for timing of the drone fly-over, the smart sensing devices may be configured to transmit their sensor data periodically, albeit at the cost of a significantly increased power consumption.

BRIEF SUMMARY

It is an objective to at least partly overcome one or more limitations of the prior art.

Another objective is to provide a technique of controlling sensor-containing electronic devices by an aerial vehicle.

A further objective is to provide such a technique that is simple to implement on existing aerial vehicles.

Yet another objective is to provide such a technique that enables low power consumption of the electronic device.

One or more of these objectives, as well as further objectives that may appear from the description below, are at least partly achieved by an electronic device, an aerial vehicle, a method of operating an electronic device, and a method of operating an aerial vehicle according to the independent claims, embodiments thereof being defined by the dependent claims.

Still other objectives, as well as features, aspects and technical effects will appear from the following detailed description, from the attached claims as well as from the drawings.

DETAILED DESCRIPTION OF EXAMPLE EMBODIMENTS

Figure 1:
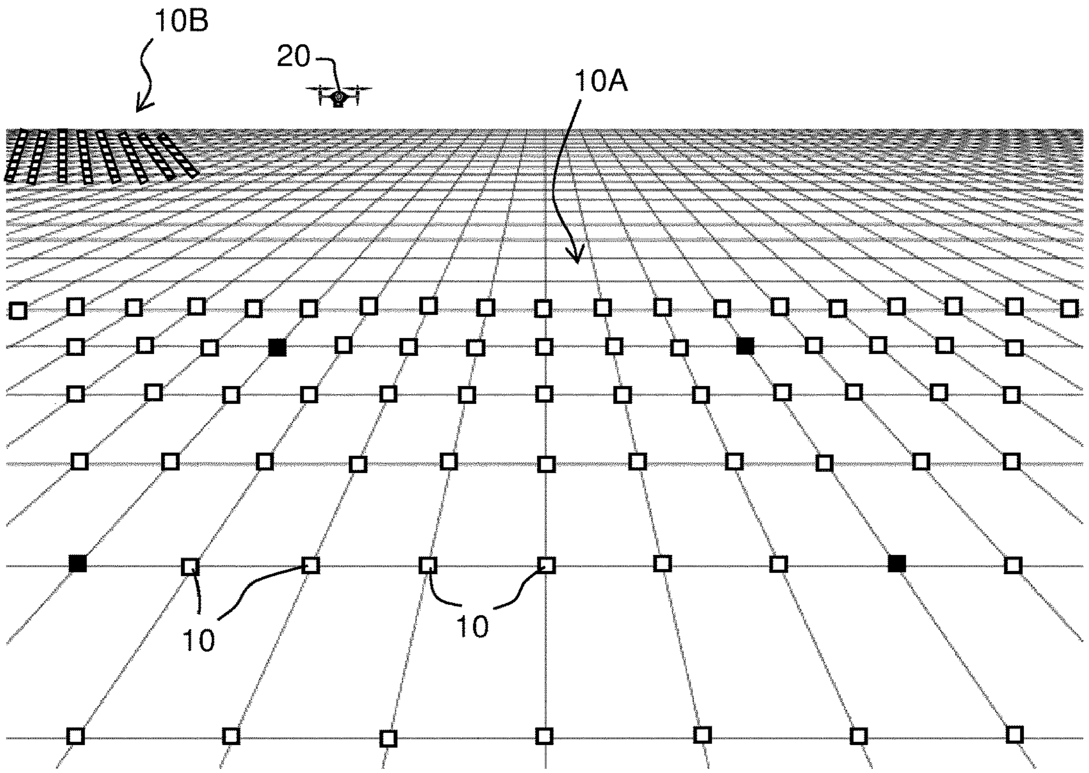
FIG. 1 shows an example of groups of smart sensing devices dispersed across a geographic region and controlled by an aerial vehicle.

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

As used herein, the terms "multiple", "plural" and "plurality" are intended to imply provision of two or more elements, whereas the term a "set" of elements is intended to imply a provision of one or more elements. The term "and/or" includes any and all combinations of one or more of the associated listed elements.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Like numbers refer to like elements throughout.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

As used herein, "aerial vehicle" refers to an aircraft of any type, manned or unmanned. Examples of manned aircrafts include helicopters and propeller airplanes with an onboard human pilot. Unmanned aircrafts lack onboard human pilots and include unmanned aerial vehicles (UAVs), also known as drones. An unmanned aircraft may be controlled by an onboard automated control system, a ground-based control system or by a ground-based human pilot. Other synonyms or variants encompassed by the term drone or UAV comprise RPAS (Remotely Piloted Aircraft System), UAS (Unmanned Aircraft System), MAV (Micro Air Vehicle), and sUAS (small Unmanned Aircraft System). Examples of UAVs include multi-rotor drones (such as tricopters, quadcopters, hexacopters, octocopters, etc.), fixed-wing drones, single-rotor helicopter drones, and fixed wing hybrid VTOL (vertical takeoff and landing) drones.

The presented disclosure relates to electronic devices that are associated with a sensor arrangement, which is operable to measure one or more sensor parameters. In this context, "associated with" implies that the electronic device is configured to receive measured sensor values from the sensor arrangement, which may be integrated into or attached to the housing of the electronic device and/or physically separated from the housing. In the following, this type of electronic device is denoted "smart sensing device", abbreviated SSD. Each SSD may be configured to measure at least one sensor parameter. In some embodiments, the SSD is a small self-powered device, which may or may not be configured for wireless data transmission. The sensor data measured by the SSD may be stored in internal memory and/or output by wireless data transmission. A plurality of SSDs may be distributed across an extended area to monitor one or more sensor parameters. The resulting sensor data from the plurality of SSDs may be collected and analyzed to gain an understanding of the spatial distribution, and optionally the temporal distribution, of measured sensor values within the extended area.

As noted in the Background section, this type of SSD may be deployed for a variety of monitoring purposes, including agriculture, smart cities, wildlife research, environmental research, healthcare, energy consumption monitoring, security monitoring, etc. In the following, the use of SSDs will be exemplified with reference to agricultural monitoring, also known as "smart agriculture". FIG. 1 illustrates a plurality of SSDs 10 which are distributed in two groups 10A, 10B across a field. In the illustrated example, the SSDs 10 are arranged in a predefined grid pattern, which is indicated with thin lines. Thereby, each SSD 10 has a known location on the field. Each SSD 10 is configured to measure one or more sensor parameters. The measured sensor parameter(s) may differ between the SSDs 10. In the example of agricultural monitoring, the ensemble of SSDs 10 in the field may be configured to measure one or more of moisture, humidity, temperature, light exposure, nutrient, pH, electrical conductivity, cation exchange capacity, organic carbon, etc. The resulting sensor data may be collected to monitor properties of the soil, the need for irrigation, the growth status of field crops, etc.

In the embodiments described herein, the operation of the respective SSD 10 is at least partly controlled by an aerial vehicle which is maneuvered across the field. In FIG. 1, the aerial vehicle is represented by a drone 20. The SSDs 10 are configured to respond to a control signal generated by the drone 20 by performing one or more dedicated actions. As described in more detail below, the control signal may originate from the propulsion system of the drone 20 and may be detected by a microphone in the respective SSD 10. Thereby, the drone 20 may selectively activate a subset of the SSDs 10, indicated as black squares in FIG. 1, to perform an action while other SSDs, indicated as open squares, remain inactivated. In another example, the drone 20 may activate all SSDs in group 10A to perform an action while the SSDs in group 10B remain inactivated. As will be described in detail below, the action may involve measuring and/or transmitting sensor data.

Figure 2A:
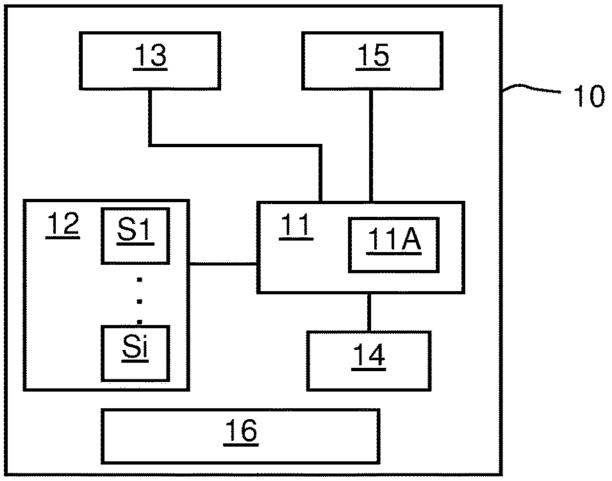
FIG. 2A is a block diagram of an example smart sensing device.

FIG. 2A is a block diagram of an SSD 10 in accordance with an example. The SSD 10 comprises a control system 11, which is a circuitry for controlling the operation of the smart device 10. In the illustrated example, the control system 11 comprises a detector 11A for detecting the control signal generated by the drone 20. Examples of the detector 11A will be described below with reference to FIGS. 7A-7B. A sensor arrangement 12 is associated with the SSD 10 and comprises one or more sensors S1, . . . , Si. The sensor arrangement 12 may be a unitary device or a combination of physically separate sensors. Each sensor S1, . . . , Si is configured to measure a respective physical property and output a corresponding sensor signal, which may or may not be electrical. The control system 11 is configured to receive the sensor signal, and thereby a measured value of the physical property, from the respective sensor. The SSD 10 further comprises a microphone 13, which is arranged to detect sound waves that arrive at the SSD 10 and convert the sound waves into an audio signal, which may or may not be electrical. The control system 11 is configured to receive and evaluate the audio signal from the microphone 13. The control system 11 is also connected to a computer memory 14 for data storage, and a communication system or unit 15 for wireless data transmission. In some embodiments, the communication system 15 comprises a transmitter or transceiver that is configured for wireless short-range communication, for example by one or more of Bluetooth, BLE, WiFi, LR-WPAN, UWB, ZigBee, Z-Wave, ANT, ANT+, 6LoWPAN, WirelessHART, ISA100, etc. The components of the SSD 10 are powered by a power source 16, which may include one or more of a battery, a fuel cell, an energy-harvesting unit, etc.

Figure 2B:
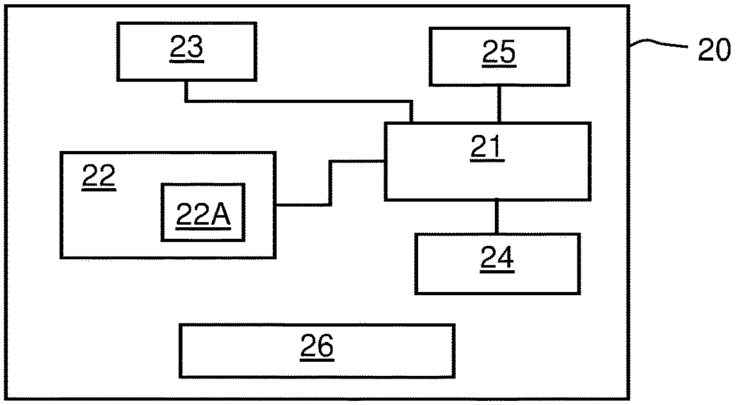
FIG. 2B is a block diagram of an example aerial vehicle.

FIG. 2B is a block diagram of a drone 20 in accordance with an example. The drone 20 comprises a control system 21, which is a circuitry for controlling the operation of the drone 20. The drone 20 comprises a propulsion system 22 for generating thrust force to move the drone 20 through the air. The propulsion system 22 may be of conventional type. In some embodiments, the propulsion system 22 comprises one or more rotors 22A which are driven to rotate to generate the thrust force of the drone 20. As is well-known in the art, the propulsion system 22 may also comprise control surfaces such as flaps, rudders, ailerons, etc. for controlling the flight direction and altitude of the drone 20. The drone further comprises a positioning system 23 for determining the position of the drone 20. In some embodiments, the positioning system 23 includes a Global Navigation Satellite System (GNSS) receiver. The GNSS receiver may be configured for communication with a satellite navigation system such as GPS, GLONASS, Galileo or BeiDou. The positioning system 23 may further comprise an altimeter. The control system 21 is configured to receive positions from the positioning system 23 and control the propulsion system 22 to move the drone on a flight path, which may or may not be predefined. For example, the control system 21 may include a conventional flight controller which is configured to receive input data from the positioning system 23 and sensors (not shown) on the drone 20, interpret the input data and output control signals to the propulsion system 22. Alternatively or in addition, the control system 21 may be configured to receive flight commands from a remote controller via the communication system 25 (below). The remote controller may or may not be operated by a ground-based human pilot.

The control system 21 is also connected to a computer memory 24 for data storage, and a communication system or unit 25 for wireless data transmission. In some embodiments, the communication system 25 comprises a receiver or transceiver configured to receive short-range wireless signals from SSDs 10. Alternatively or additionally, the communication system 20 may comprise a transmitter or transceiver for long-range wireless communication. Such long-range communication may utilize any available communication technology, proprietary or standardized, including but not limited to GSM, EDGE, HSDPA, W-CDMA, CDMA, TDMA, LTE, 5G, Wi-MAX, LORAN, etc. Alternatively or additionally, the long-range communication may involve satellite communication. The long-range communication may be utilized for data transfer from the drone 20 to a remote computer (cf. FIG. 6C). The components of the drone 20 are powered by a power source 26, which may include one or more of a battery, a fuel cell, an energy-harvesting unit, a fuel tank, etc.

Figure 3:
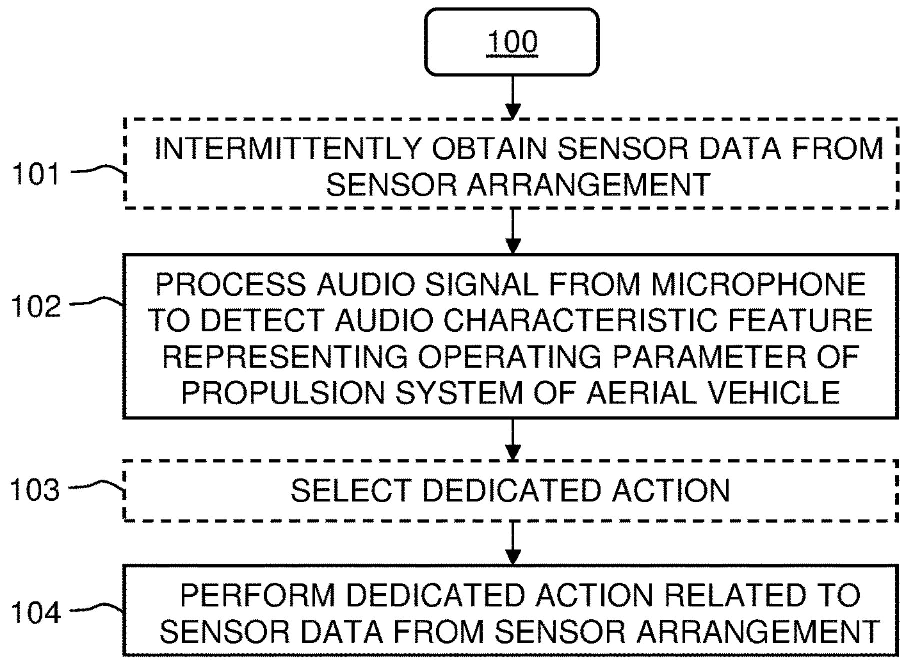
FIG. 3 is a flow chart of an example method of operating a smart sensing device.

FIG. 3 is a flow chart of an example method 100 of operating an SSD 10. The method 100 will be described with reference to the SSD 10 in FIG. 2A in relation to the drone 20 in FIG. 2B. The method 100 may be performed by the control system 11. Optional steps are indicated by dashed lines. The method 100 comprises a step 102 of processing the audio signal from the microphone 13 to detect an audio characteristic feature (ACF) representing an operating parameter of the propulsion system 22 of the drone 20. Examples of the ACF will be described further below. Step 104 is performed in response to the detection of the ACF by step 102. In step 104, a dedicated action is performed by the SSD 10 in relation to sensor data provided by the sensor arrangement 12.

It is realized that the method 100 provides a simple technique of controlling SSDs 10 by a drone 20, since the respective SSD 10 will automatically perform the dedicated action upon detection of the ACF. The respective SSD 10 is only triggered to perform the action if its microphone 13 detects sound waves generated by the propulsion system 22 of the drone 20 and if these sound waves comprise the ACF. In the example of FIG. 1, the drone 2 may fly across the field to selectively trigger the SSDs 10 to perform the dedicated action.

In some embodiments, the ACF may be generated with different properties to trigger different SSDs to perform the action. In one example, the drone 20 may generate an ACF with a first property to trigger the SSDs 10 in group 10A and an ACF with a second property to trigger the SSDs 10 in group 10B. In another example, SSDs dedicated to temperature measurement are triggered by a first property of the ACF and SSDs dedicated to humidity measurement are triggered by a second property of the ACF. Thus, in the method 100, step 102 may comprise extracting and evaluating the property of the ACF to determine if the ACF should trigger the dedicated action.

In some embodiments, as indicated in FIG. 3, the method 100 comprises a step 103 of selecting the dedicated action among different dedicated actions based on the ACF. For example, the respective SSD 10 may associate different properties of the ACF with different actions. One property may trigger a measurement by the sensor arrangement 12, and another property may trigger a data transmission, etc. Alternatively, the actions may differ with respect to the physical properties represented by the sensor data. For example, the drone 20 may generate an ACF with a first property to trigger SSDs 10 to measure and/or transmit temperature data and generate an ACF with a second property to trigger SSDs 10 to measure and/or transmit humidity data.

In some embodiments, as indicated in FIG. 3, the method 100 comprises a step 101 of intermittently obtaining sensor data from the sensor arrangement 12 and storing the sensor data in memory 14. For example, the SSD 10 may be configured to obtain measured value(s) from the sensor arrangement 12 in accordance with a predefined schedule. The use of a predefined schedule enables power-efficient operation of the SSD 10, which may be configured to be in a low-power state by default and intermittently leave the low-power state to obtain measured value(s). In non-limiting example, step 101 results in the measured value(s) being obtained a number of times every hour, day, or week.

In some embodiments, the dedicated action performed in step 104 comprises retrieving the sensor data that has been stored by step 101 in memory 14 and transmitting the sensor data in a wireless signal, for receipt by the drone 20. It is realized that the use of the ACF provides a convenient and simple technique of gathering sensor data from SSDs 10 by use of a drone 20.

Figure 4:
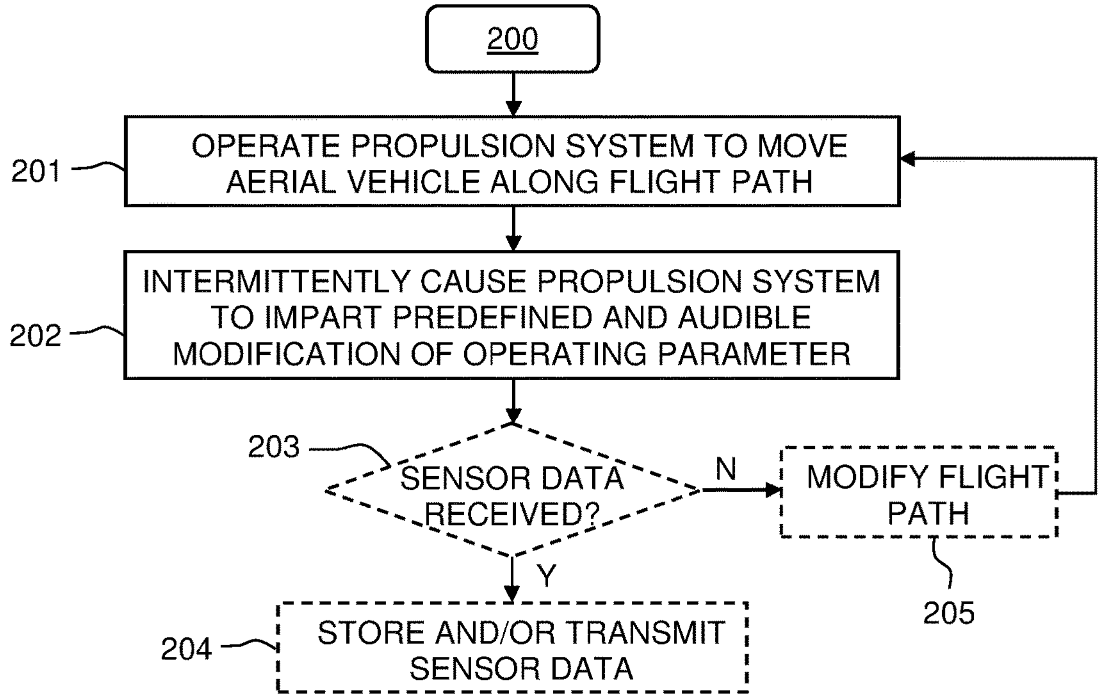
FIG. 4 is a flow chart of an example method of operating an aerial vehicle.

FIG. 4 is a flowchart of an example method 200 of operating a drone 20 in accordance with an example. The method 200 will be described with reference to the drone 20 in FIG. 2B. The method 200 may be performed by the control system 21. Optional steps are indicated by dashed lines. The method 200 comprises a step 201 of operating the propulsion system 22 to move the drone 20 along a flight path based on position data from the positioning system 23. The method 200 further comprises a signaling step 202, which is performed during step 201. In step 202, the propulsion system 22 is intermittently caused to impart a predefined and audible modification of an operating parameter of the propulsion system 22. Step 202 may be performed repeatedly in accordance with a predefined schedule, for example periodically, or randomly. Step 202 leverages the sound waves that are inherently generated by the propulsion system 22 while the drone 20 is in flight. These sound waves propagate through the surrounding medium to the microphone 13 of a respective SSD 10. By the predefined modification, the above-mentioned ACF is included or represented by the sound waves and may thus be detected in the audio signal that is generated by the microphone 13. The modification is "predefined" in the sense that it results in an ACF that is recognizable by one or more SSDs 10.

The method 200 is simple to implement on existing drones 20 or any other aerial vehicle. The predefined modification may be achieved by changing the control signal to the propulsion system 22 by the control system 21 and may thus be implemented by software without the need for physical reconfiguration of the drone 20 itself.

The modification may be imparted to represent a modulation pattern. Any modulation pattern may be used, and the operating parameter may be modified in any conceivable way that results in an ACF being detectable in the audio signal from a microphone.

It is currently believed that a robust ACF is achieved by imparting the modification to an operating frequency of the propulsion system 22. The modification of the operating frequency is believed to have a minor impact on the flight path of the drone 20, since the modification is performed intermittently, for example in short bursts. Further, the control system 21 of the drone 20 may be configured to counteract unintended changes in flight path caused by the modification by use of control surfaces (flaps, rudders, ailerons, etc.).

In some embodiments, the modification is imparted as a modulation of the operating frequency by a predefined modulation frequency. The modulation is thus predefined through its modulation frequency. Such a predefined periodic modulation is simple to detect in an audio signal from a microphone. In some embodiments, different predefined modulation frequencies are used to generate the ACF with different properties. In other words, the ACF is a modulation and the property of the ACF is the modulation frequency.

Figure 6A:
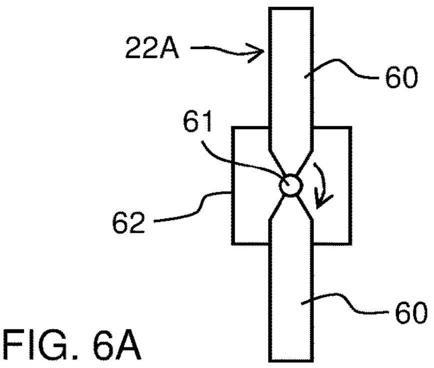
FIG. 6A is a top plan view of a rotor in the propulsion system of an aerial vehicle.
Figure 6C:
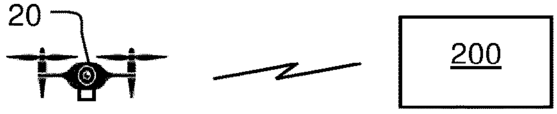
FIG. 6C illustrates long range communication between the drone and a remote computer.
Figure 6B:
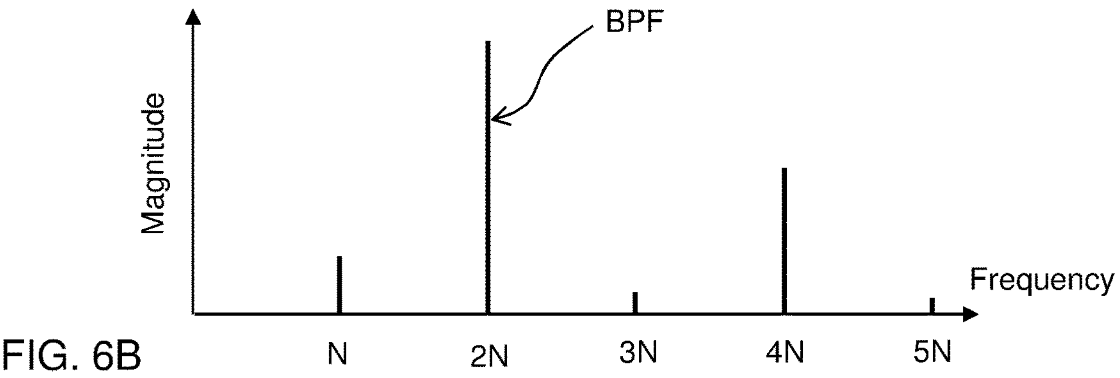
FIG. 6B is a graph of frequencies of sound waves generated by the rotor in FIG. 6A.

FIG. 6A is a schematic top view of a rotor 22A in a propulsion system 22 of a drone 20. In the illustrated example, the rotor 22A has two blades 60 but any number of blades may be used. The blades 60 are joined to an axis 61, which is driven to rotate by a motor unit 62, as indicated by an arrow. The rotation frequency of the axis 61, and thus the rotor 22A, may be set by a control signal from the control system 21. In a non-limiting example, the control signal may be pulse-width modulated (PWM) to set the rotation frequency. Assuming that the axis 61 is driven to rotate with a rotor frequency N, FIG. 6B shows an example of the frequency content in sound waves generated by the rotor 22A. As shown, the dominant frequency is the blade passing frequency, BPF, which is given by the number of blades multiplied by the rotor frequency, here 2N. There are also a number of overtones (3N, 4N, 5N, . . . ). In some embodiments, the SSDs 10 are configured to detect the modulation of the BPF.

To give a numerical example, small to medium sized drones may have a rotor frequency in the range 4,000 to 12,000 rpm. In a non-limiting example, step 202 may impart a modulation of the rotor frequency with an amplitude of 10-100 rpm, at a modulation frequency of 10-100 Hz.

Reverting to FIG. 4, the method 200 may further comprise a step 203 of operating the communication system 25 to listen for one or more data transmissions containing sensor data from one or more SSDs 10. Step 203 may be performed if the predefined modification by step 202 is intended to trigger one or more SSDs 10 to transmit sensor data in a wireless signal (cf. step 104 in FIG. 3). Step 203 may receive the sensor data by intercepting the wireless signal and extracting the sensor data from the wireless signal. Alternatively, step 203 may establish a wireless connection with the respective SSD 10 and receive the sensor data in a signal exchange between the drone 20 and the respective SSD 10.

Step 203 may further comprise evaluating if sensor data has been received from all expected SSDs. If the sensor data has been received, the method 200 may proceed to step 204, in which the sensor data is stored in memory 24. The sensor data may then be transferred from memory 24 when the drone 20 arrives at its base. Alternatively or additionally, as shown in FIG. 6C, the sensor data may be transmitted from the drone 20 to a remote computer 200, for example by the above-mentioned long-range communication. On the other hand, if sensor data has not been received from all expected SSDs in step 203, the method 200 may proceed to step 205, in which the flight path of the drone 20 is modified to cause step 201 to bring the drone closer to the SSDs 10. Meanwhile, any sensor data that has been received may be stored in memory 24 and/or transmitted by analogy with step 204.

The drone 20 may detect that the sensor data has not been received from the expected SSDs in different ways. If the SSDs 10 are associated with unique IDs, each SSD 10 may include its ID in the data transmission, and the drone 20 may store information about the SSDs 10 that are expected to respond to step 202. If one or more IDs are missing in the incoming data transmissions, received by step 203, all sensor data has not been received. In a variant, the drone 20 may store information about the number of SSDs 10 that are expected to respond to step 202. If the number of received data transmissions from different SSDs 10 deviate from the expected number, all sensor data has not been received.

In step 205, the flight path may be modified by decreasing the altitude of the drone 20. In a more advanced alternative, step 205 is performed to direct the drone 20 closer to the one or more SSDs 10 that have not transmitted sensor data as expected, denoted "missing SSDs" in the following. In one example, the drone 20 may store a mapping of the SSDs 10, for example to the grid of FIG. 1, and thereby identify the approximate location of the missing SSDs. In another example, the wireless signals received by the drone 25 from the SSDs 10 may be processed, by the drone 20, to position the drone 20 relative to the grid and thereby to the missing SSDs. Such positioning may be performed based on the relative signal strengths of the incoming wireless signals, the angle of incidence of the incoming wireless signals, etc. Any positioning method may be used, including but not limited to triangulation, trilateration, SLAM, etc. The positioning may also use data from an inertial sensor if present on the drone 20. In a further variant, the positioning may operate on estimated distances to the drone 20, as determined by the SSDs 10, for example based on a wireless signal transmitted by the drone 20 and/or based on the sound waves generated by the propulsion system 22 of the drone 20. The respective SSD 10 may transfer the estimated distance to the drone 20 by short-range wireless communication.

There are several possible reasons that the drone 20 does not receive sensor data from an SSD 10. One reason may be an unexpected attenuation of the sound waves before they arrive at the microphone 13 in the SSD 10, for example as a result of weather events such as rain, fog, snow, wind, sandstorms, etc. Another reason may be a decrease in transmission range of the short-range wireless signal as a result of weather events and/or a reduced transmission power of the communication system 15 in the SSD 10.

Figure 5A:
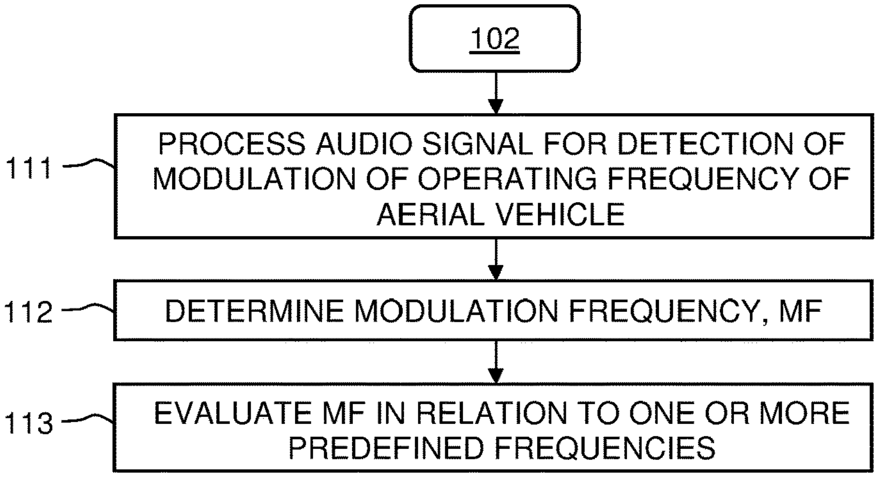
FIGS. 5A-5C are flowcharts example procedures included in the method of FIG. 3.

FIG. 5A is a flow chart of an example process that corresponds to step 102 in FIG. 3 and is performed by an SSD to detect and evaluate the ACF. The process in FIG. 5A presumes that the drone imparts a predefined modulation to the operating frequency of the propulsion system to trigger the SSD to perform a dedicated action. In step 211, the audio signal from the microphone 13 is processed for detection of the modulation. Step 211 may be implemented in any conventional way. Two processing-efficient techniques are described further below with reference to FIGS. 7A-7B. Step 212 determines the frequency of the modulation, denoted modulation frequency or MF in the following. Step 213 evaluates the MF in relation to one or more predefined frequencies. The respective predefined frequency may be given as a discrete value or as a frequency range. If there is a match between the MF and a predefined frequency, the process 102 concludes that an ACF has been detected.

Figure 5B:
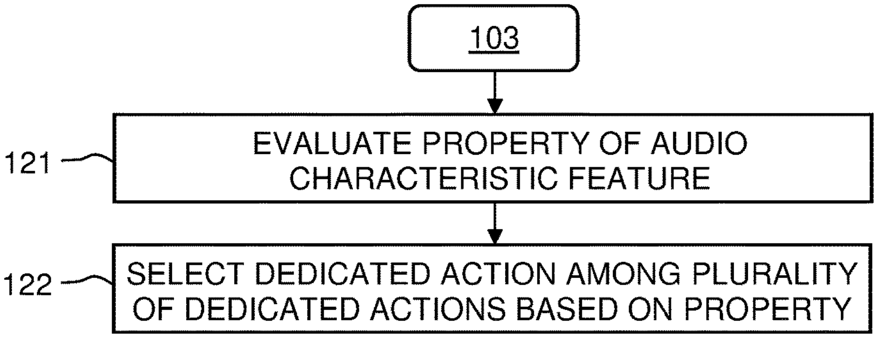

FIG. 5B is a flow chart of an example process that corresponds to step 103 in FIG. 3. The process in FIG. 5B presumes that the drone 20 imparts a specific property to the ACF to trigger the SSD 10 to perform a specific action among different available actions. Step 121 comprises evaluating the property of the ACF, as detected by step 102, for example in relation to a set of predefined properties. Each such predefined property may be associated with a respective dedicated action. If the property of the ACF matches one of the predefined properties, step 122 selects the dedicated action that is associated with the property. This dedicated action is then performed by step 104. The property of the ACF may take many different forms. In some embodiments, the property is the above-mentioned MF.

Figure 5C:
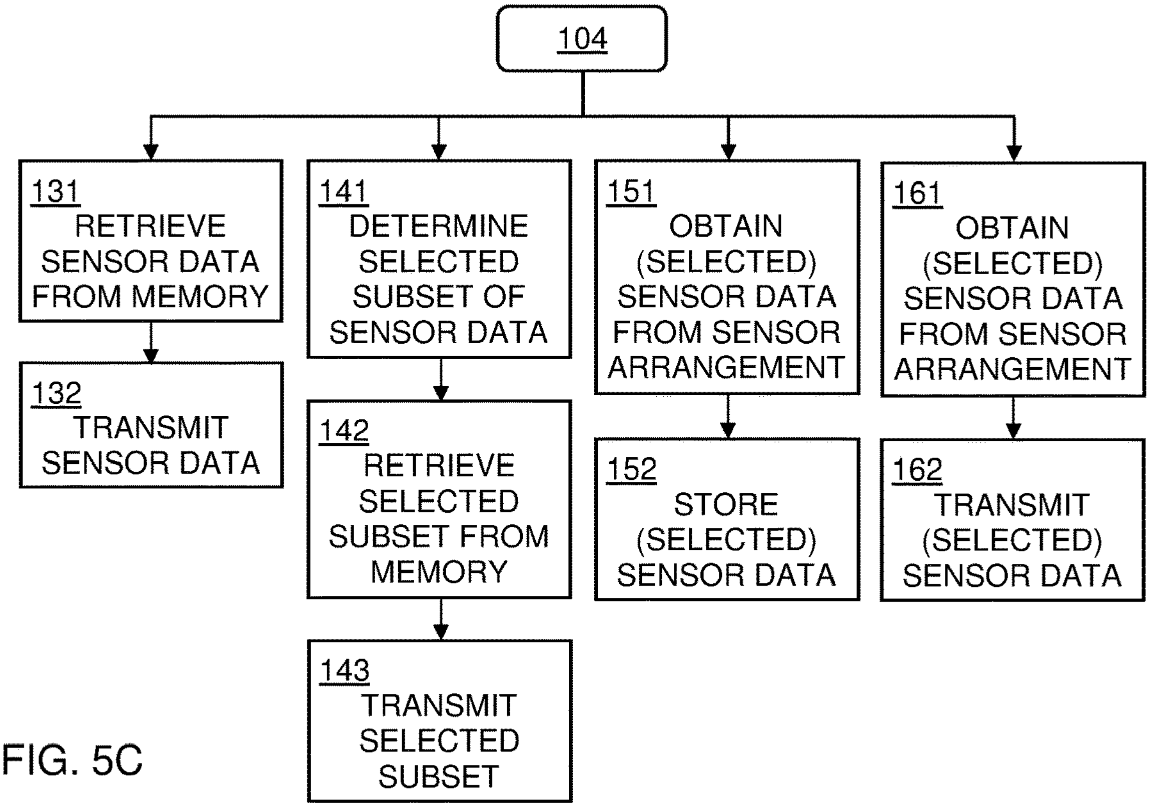

FIG. 5C is an example process that corresponds to step 104 in FIG. 3. The process is designed to perform one of four different actions depending on the property of the ACF. A first action comprises retrieving sensor data from memory 14 (step 131) and operating the communication system 15 to transmit the sensor data by short-range communication (step 132). A second action comprises determining a selected subset of the sensor data that is stored in memory 14 (step 141), retrieving the selected subset from memory 14 (step 142) and operating the communication system 15 to transmit the selected subset by short-range communication (step 143). The selected subset may be predefined for the second action. For example, the selected subset may be defined based on time and/or type. In one example, the selected subset is measured by the sensor arrangement 12 within a given time period. In another example, the selected subset represents one or more specific sensor parameters, such as temperature, humidity etc. A third action comprises obtaining sensor data from the sensor arrangement 12 (step 151) and storing the sensor data in memory 14 (step 152). The sensor data may be obtained from all or a selected subset of the sensors in the sensor arrangement 12. A fourth action comprises obtaining sensor data from the sensor arrangement 12 (step 161) and transmitting the sensor data by short-range communication (step 162). Like for the third action, the sensor data may be obtained from all or a selected subset of the sensors in the sensor arrangement 12.

The examples in FIG. 5C serve to illustrate various embodiments of the dedicated action that may be performed by an SSD 10 upon detection of the ACF.

In some embodiments, the dedicated action comprises transmitting, by the communication unit 15, a wireless signal to represent one or more sensor data readings by the sensor arrangement 12, as exemplified by steps 132, 143 and 162 in FIG. 5C. The sensor data reading(s) may be retrieved from memory 14 or obtained from the sensor arrangement 12. Each sensor data reading may be a measured value provided by a sensor in the sensor arrangement 12.

In some embodiments, the dedicated action comprises retrieving all sensor data from memory 14, or a subset of the sensor data, and transmitting, by the communication system 15, a wireless signal to represent the thus-retrieved sensor data, as exemplified by steps 131 and 141-142 in FIG. 5C.

In some embodiments, the dedicated action comprises obtaining one or more sensor data readings from the sensor arrangement 12, as exemplified by steps 151 and 161. The sensor data reading(s) may be stored in memory 14 (step 152) or transmitted to the drone 20 (step 162).

In some embodiments, the dedicated action relates to one or more specific sensor parameters among a plurality of sensor parameters. Only the SSDs that are capable of measuring the specific sensor parameter(s) responds to the ACF, for example by obtaining sensing data reading(s) from the sensor arrangement 12 and/or retrieving sensor data representing the specific sensor parameter(s) from memory 14.

In some embodiments, an SSD 10 that is triggered to transmit a wireless signal, may refrain from transmitting the wireless signal if it is unable to retrieve sensor data from memory 14 or obtain a sensor data reading from the sensor arrangement 12. This will save power in the SSD 10. In other embodiments, the SSD 10 may instead transmit the wireless signal to indicate a lack of measurement data. Such a wireless signal may be useful to avoid that the drone 20 identifies the SSD as a missing SSD and performs step 205 in FIG. 4.

Based on the foregoing, it is realized that a drone 20 is operable to trigger one or more SSDs 10 to perform a measurement of one or more sensor parameters at a specific time point by flying sufficiently close to one or more SSDs 10 while performing the method 200 in FIG. 4. Depending on implementation, the drone 20 may be operable to trigger all SSDs or a specific subset of SSDs.

Based on the foregoing, it is also realized that a drone 20 is operable to trigger one or more SSDs 10 to transmit sensor data at a specific time point by flying sufficiently close to one or more SSDs 10 while performing the method 200 in FIG. 4. Again, depending on implementation, the drone 20 may be operable to trigger all SSDs or a specific subset of SSDs.

Figure 9:
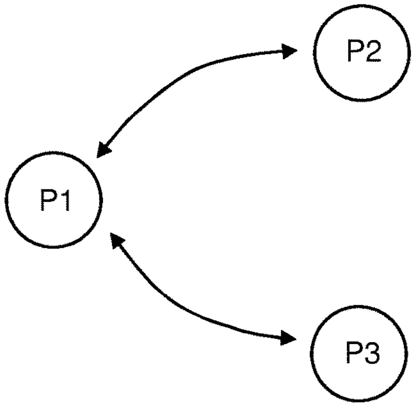
FIG. 9 depicts example transitions between power states of a smart sensing device.

In some embodiments, the respective SSD 10 is operable in different power states. FIG. 9 illustrates transitions between three different power states P1-P3. State P1 is a low-power state, in which a minimum of functionality in the SSD 10 is active. To minimize power consumption, P1 may be the default state of the SSD 10. State P2 is a high-power state, in which at least the communication system 15 is active and operable to transmit wireless signals. The SSD 10 may be intermittently switched to state P2 from state P1 upon detection of an ACF that triggers data transmission (cf. steps 132, 143, 162 in FIG. 5C). State P3 is another high-power state, in which the communication system 15 is disabled but the SSD 10 is operable to obtain sensor data readings from the sensor arrangement 12 for storage in memory 14. The power consumption is lower in state P3 than state P2. The SSD 10 may be intermittently switched to state P3 from state P1 by step 101 (FIG. 3), for example in accordance with a predefined schedule. The SSD 10 may also be switched to state P3 from state P1 upon detection of an ACF that triggers data storage but no data transmission (cf. step 152).

To enable the low-power state P1 to be the default state, the SSD 10 may be provided with power-efficient circuitry for detecting the ACF while the SSD 10 is in state P1. In FIG. 1, this circuitry is embodied by the detector 11A. In some embodiments, the detector 11A is a dedicated hardware circuit. Such a detector 11A is thus operable to detect the ACF without invoking any software routines within the control system 11 and may reduce the power-consumption in state P1 to a minimum. However, in a variant, the detector 11A is implemented by computer instructions executed by one or more processors.

Figure 7A:
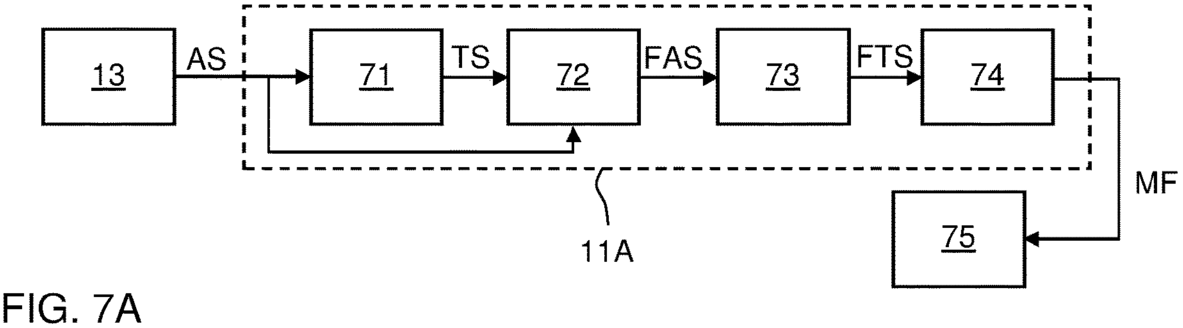
FIGS. 7A-7B are block diagrams of example audio-feature detectors included in a control system of a smart sensing device.
Figure 8:
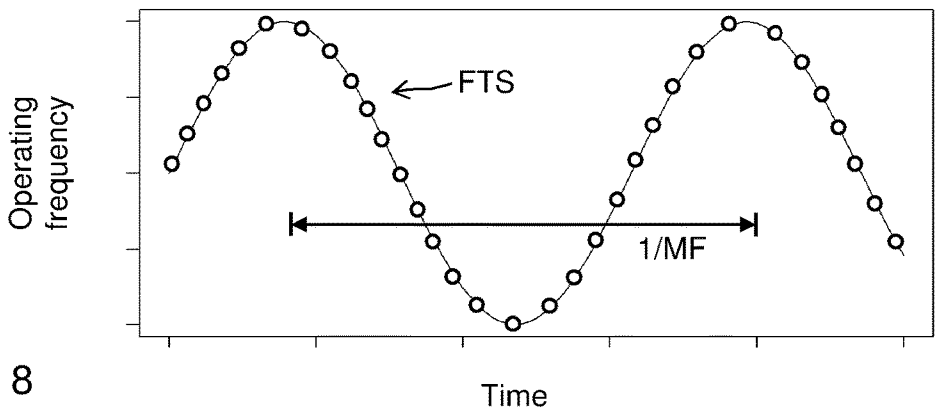
FIG. 8 is a graph of data points representing a modulated operating frequency of an aerial vehicle.

FIG. 7A is a block diagram of an ACF detector 11A in accordance with an example. The ACF detector 11A is connected to receive the audio signal, AS, from the microphone 13 and comprises a pipeline of sub-units or modules 71-74 that are operated in sequence to detect the ACF in the AS. The sequential operation of the modules 71-74 enables power savings by selective activation of downstream modules. In the illustrated example, the AS is received by a wakeup module 71, which is configured to process the AS for determination of a magnitude value and to selectively activate, based on the magnitude value, one or more of the other modules 72-74 in the detector 11A. For example, module 71 may generate a trigger signal, TS, when the magnitude value exceeds a threshold value. The magnitude value represents the loudness of the incoming sound waves and may be given by any conventional metric such as peak-to-peak pressure, peak pressure, RMS pressure, sound pressure level (SPL), etc. The TS activates a bandpass module 72, which is configured operate a bandpass filter on the AS to generate a filtered audio signal, FAS. In the example of the ACF representing a modulation of an operating frequency of a drone propulsion system, the bandpass filter may be preconfigured to pass the modulated operating frequency. As noted above, the operating frequency may be the BPF of a rotor 21A on the drone 20. If the operating frequency is varied to control the drone on its flight path, the bandpass filter may have a wider passband to pass all conceivable operating frequencies. Alternatively, module 72 may comprise a plurality of bandpass filters with passbands centered on different possible operating frequencies, each resulting in a respective FAS. The respective FAS is received by a modulation reconstruction module 73, which is configured to process the FAS to generate a time sequence of frequency values, FTS. The frequency values in the FTS represent the dominating frequency in the FAS at consecutive time points. An example of an FTS is shown in FIG. 8, in which the open circles represent the operating frequency as determined by module 73 at consecutive time points. As seen, the operating frequency varies periodically, as a result of the imposed modulation. The FTS is received by a modulation determination module 74, which is configured to process the FTS to determine the MF. As understood from FIG. 8, the MF may be calculated as the inverse of the period of the FTS. The MF is output by the detector 11A and received by an power management module 75, which is configured to selectively change the power state of the SSD 10 based on the MF. For example, module 75 may switch the SSD 10 to state P2 if the MF corresponds to an action that involves data transmission, and to state P3 if the MF corresponds to an action that involves data capture and data storage but no data transmission.

Figure 7B:
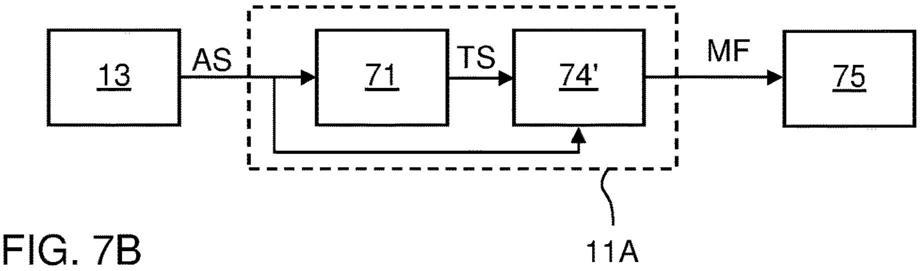

FIG. 7B is a block diagram of an ACF detector 11A in accordance with another example. Like in FIG. 7A, the detector 11A is connected to receive the audio signal, AS, from the microphone 13 and comprises a pipeline of subunits or modules 71, 74' that are operated in sequence to detect the ACF in the AS. The wakeup module 71 may be the same as in FIG. 7A. The TS from the wakeup module 71 activates a machine learning-based module 74', which is configured to detect the ACF based on the AS. The machine learning-based model may be of conventional type. For example, the module 74' may comprise a neural network that has been trained to detect the ACF based on the AS and/or based on features extracted from the AS. In the illustrated example, the module 74' outputs an MF, which is received by a power management module 75, which may be the same as in FIG. 7A. However, it is to be understood that the detector 11A, by the module 74', may be configured to detect any type of ACF.

Figure 10:
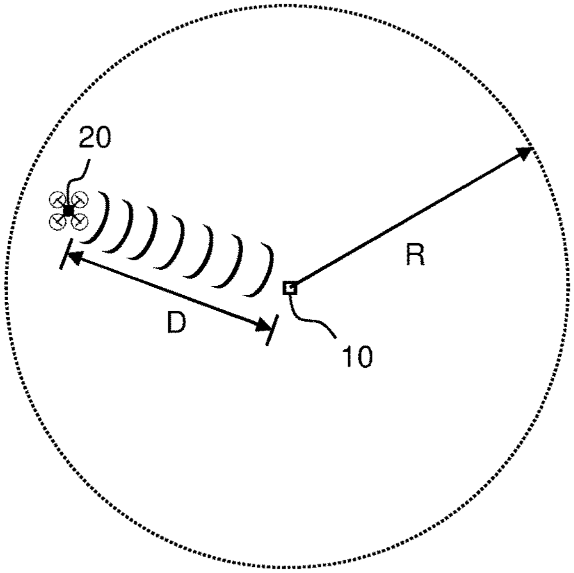
FIG. 10 depicts an example relation between detector sensitivity and wireless signal range of a smart sensing device.

FIG. 10 is a top view of a drone 20 in relation to an SSD 10 and serves to illustrate a conceivable optimization of the SSD 10. The drone 20 is located at distance D from the SDD 10 and the sound waves from the propulsion system on the drone 20 propagate from the drone 20 and reach the SSD 10. It may be noted that sound waves generally propagate omnidirectionally from the drone 20, although they are directional in FIG. 10. In response to an ACF included in the sound waves, the SSD 10 may transmit a short-range wireless signal. The range of the wireless signal is indicated by R in FIG. 10. To ensure that the wireless signal reaches the drone 20, the distance D should be less than the range R. This may be achieved by configuring the control system 11 in the SSD 10 to start processing the audio signal only when the distance D is less than the range R. This may in turn be achieved by adjusting the threshold level of the wakeup module 71 to correspond to a predefined distance to the drone 20 which is less than the range R and/or by adjusting the power of the wireless short-range transmitter in the communication system 15 to set the range R to exceed the predefined distance.

In some embodiments, the drone 20 is configured to detect ambient sound, by the microphone 13 or a separate microphone, and adjust the modification of the operating parameter in step 202 (FIG. 4) to ensure that the modification is sufficiently different from the ambient sound. This may improve the ability of the SSDs 10 to detect the ACF. As used herein, "ambient sound" refers to any sound pattern that does not originate from the drone 20.

It is conceivable that the drone 20, in addition to or instead of modifying the flight path in step 205 (FIG. 4), adjusts the propulsion system 20 to increase the propagation distance of the sound waves, for example by increasing the magnitude of the sound waves at the operating frequency. Alternatively or additionally, the drone 20 may adjust the modification of the operating parameter to facilitate detection of the ACF at the SSD 10, for example by switching to a different modulation pattern.

Figure 11:
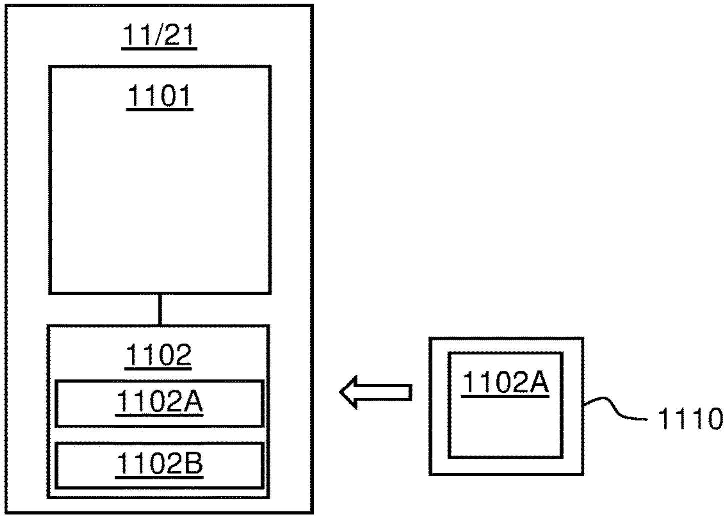
FIG. 11 is a block diagram of a control system which may implement functions disclosed herein.

The structures and methods disclosed herein may be implemented by hardware or a combination of software and hardware. FIG. 11 schematically depicts a control system, which is at least partly implemented by software and which may represent the control system 11 in the sensor device 10 or the control system 21 in the UAV 20. The control system 11, 21 comprises one or more processors 1001 and computer memory 1002. The processor(s) 1001 may, for example, include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 1002A comprising computer instructions is stored in memory 1002 and executed by the processor(s) 1001 to perform any of the methods, procedures, operations, functions, or steps described in the foregoing. As indicated in FIG. 11, memory 1002 may also store control data 1002B for use by the processing system 1002. The control program 1002A may be supplied to the computing resource on a computer-readable medium 1100, which may be a tangible (non-transitory) product (for example, magnetic medium, optical disk, read-only memory, flash memory, etc.) or a propagating signal.

In the following, clauses are recited to summarize some aspects and embodiments of the invention as disclosed in the foregoing.

C1. An electronic device, comprising: a sensor arrangement (12); a control system circuitry (11) operable to obtain sensor data from the sensor arrangement (12); and a microphone (13) configured to provide an audio signal representing sound waves received by the microphone (13), wherein the control system circuitry (11) is configured to process the audio signal for detection of an audio characteristic feature representing an operating parameter of a propulsion system (22) of an aerial vehicle (20), and, upon said detection, perform a dedicated action related to the sensor data, wherein the audio characteristic feature is a modulation of an operating frequency of the propulsion system (22) of the aerial vehicle (20).

C2. The electronic device of C1, wherein the operating frequency is a blade passing frequency of a rotor (22A) driven by the propulsion system (22).

C3. The electronic device of C1 or C2, wherein the control system circuitry (11), to detect the audio characteristic feature, is configured to process the audio signal (AS) for detection of the modulation, determine a frequency of the modulation, and evaluate the frequency in relation to one or more predefined frequencies.

C4. The electronic device of any preceding clause, wherein the control system circuitry (11) is configured to perform different dedicated actions depending on a property of the audio characteristic feature.

C5. The electronic device of C4, wherein the property is a frequency of the modulation.

C6. The electronic device of any preceding clause, which further comprises a communication unit (15) for wireless data transmission, wherein the dedicated action comprises transmitting, by the communication unit (15), a wireless signal to represent one or more sensor data readings by the sensor arrangement (12).

C7. The electronic device of C6, wherein the control system circuitry (11) is configured to obtain sensor data from the sensor arrangement (12) in accordance with a predefined schedule and store the sensor data in a memory (14), and wherein the dedicated action comprises retrieving at least a subset of stored sensor data in the memory (14) and transmitting, by the communication unit (15), the wireless signal to represent said at least a subset of the stored sensor data.

C8. The electronic device of C7, wherein control system circuitry (11) is configured to select said at least a subset based on the audio characteristic feature.

C9. The electronic device of C7 or C8, wherein the subset represents at least one sensor parameter among a plurality of sensor parameters that are detectable by the sensor arrangement (12).

C10. The electronic device of any one of C7-C9, wherein the control system circuitry (11) is configured to, if said at least a subset of stored sensor data is unavailable in the memory (14), transmit the wireless signal to indicate a lack of measurement data.

C11. The electronic device of any one of C7-C9, wherein the control system circuitry (11) is configured to, if said at least part of the sensor data is unavailable in the memory (14), refrain from transmitting the wireless signal.

C12. The electronic device of any one of C6-C11, wherein the control system circuitry (11) is configured to start processing the audio signal (AS) for detection of the audio characteristic feature when a magnitude of the audio signal (AS) corresponds to sound waves received by the microphone (13) from the propulsion system (22) when the aerial vehicle (20) is spaced from the electronic device by a predefined distance (D), wherein the predefined distance (D) is less than a range (R) of the wireless signal.

C13. The electronic device of any preceding clause, wherein the dedicated action comprises obtaining a sensor data reading from the sensor arrangement (12).

C14. The electronic device of any preceding clause, which is operable in at least a low-power state (P1) and a high-power state (P2; P3), wherein the control system circuitry (11) is configured to set the electronic device in the high-power state (P2; P3) upon said detection of the audio characteristic feature, and wherein the control system circuitry (11) comprises a detector (11A), which is operable to process the audio signal (AS) for detection of the audio characteristic feature while the electronic device is in the low-power state (P1).

C15. The electronic device of C14, wherein the detector (11A) comprises a pipeline of sub-units which are operated in sequence to detect the audio characteristic feature in the audio signal, wherein the pipeline comprises a first sub-unit (71), which is configured to process the audio signal (AS) for determination of a magnitude value and to selectively activate, based on the magnitude value, one or more further sub-units (72, 73, 74; 74') in the pipeline.

C16. The electronic device of C15, wherein the one or more further sub-units (72, 73, 74; 74') comprise a second sub-unit (72), a third sub-unit (73), and a fourth sub-unit (74), wherein the second sub-unit (72) is configured to operate a bandpass filter on the audio signal (AS) to generate a filtered audio signal (FAS), the bandpass filter being configured to transmit the operating frequency, wherein the third sub-unit (73) is configured to process the filtered audio signal (FAS) to generate a time sequence (FTS) of frequency values of a dominating frequency in the filtered audio signal (FAS), and wherein the fourth sub-unit (74) is configured to process the time sequence (FTS) of frequency values to determine a frequency of the modulation of the operating frequency.

C17. The electronic device of C15, wherein the one or more further sub-units (72, 73, 74; 74') comprise a machine learning-based model (74'), which is configured to detect the audio characteristic feature based on the audio signal (AS).

C18. The electronic device of any one of C14-C17, wherein the detector (11A) is a dedicated hardware circuit.

C19. The electronic device of any preceding clause, wherein the audio characteristic feature represents a predefined and audible modification of the operating parameter of the propulsion system (22).

C20. An aerial vehicle, comprising: a propulsion system (22); a positioning system (23); and a control system circuitry (21), which is configured to operate the propulsion system (22) to move the aerial vehicle along a flight path based on position data from the positioning system (23), wherein the control system circuitry (21) is further configured to intermittently cause the propulsion system (22) to impart a predefined and audible modification of an operating frequency of the propulsion system (22), wherein the predefined and audible modification is a modulation of the operating frequency by a predefined modulation frequency.

C21. The aerial vehicle of C20, wherein the propulsion system (22) comprises at least one rotor (22A), and the operating frequency is a blade passing frequency of the rotor (22A).

C22. The aerial vehicle of C20 or C21, further comprising a communication unit (25) for wireless data communication, wherein the control system circuitry (21) is configured to, after causing the propulsion system (22) to impart the predefined and audible modification, operate the communication unit (25) to listen for one or more data transmissions containing sensor data.

C23. The aerial vehicle of C22, wherein the control system circuitry (21) is configured to, if the one or more data transmissions are not received, modify the flight path.

C24. The aerial vehicle of C22 or C23, wherein the control system circuitry (21) is configured to, upon receipt of the one or more data transmissions, extract sensor data from the one or more data transmissions and store the sensor data in a memory (24) in the aerial vehicle and/or transmit the sensor data, by the communication unit (25), to a remote computer (200).

C25. A system comprises a plurality of electronic devices in accordance with any one of C1-C19 and at least one aerial vehicle in accordance with any one of C20-C24.

C26. A method of operating an electronic device, said method comprising: processing (102) an audio signal representing sound waves received by a microphone in the electronic device, to detect an audio characteristic feature originating from a propulsion system of an aerial vehicle; and performing (104), upon said detection, a dedicated action related to sensor data detectable by a sensor arrangement associated with the electronic device, wherein the audio characteristic feature is a modulation of an operating frequency of the propulsion system of the aerial vehicle.

C27. A method of operating an aerial vehicle, said method comprising: operating (201) a propulsion system on the aerial vehicle to move the aerial vehicle along a flight path based on position data from a positioning system on the aerial vehicle; and intermittently causing (202) the propulsion system to impart a predefined and audible modification of an operating frequency of the propulsion system, wherein the predefined and audible modification is a modulation of the operating frequency by a predefined modulation frequency.

C28. A computer-readable medium comprising computer instructions (1102A) which, when executed by one or more processors (1101), cause the one or more processors (1101) to perform the method of C26 or C27.

The invention claimed is:

1. An electronic device, comprising:

a sensor arrangement, a control system circuitry operable to obtain sensor data from the sensor arrangement, and a microphone configured to provide an audio signal representing sound waves received by the microphone, wherein the control system circuitry is configured to process the audio signal for detection of an audio characteristic feature representing an operating parameter of a propulsion system of an aerial vehicle, and, upon said detection, perform a dedicated action related to the sensor data, wherein the audio characteristic feature is a predefined modulation of an operating frequency of the propulsion system of the aerial vehicle, and the control system circuitry is configured to perform different dedicated actions depending on a property of the audio characteristic feature.

2. The electronic device of claim 1, wherein the operating frequency is a blade passing frequency of a rotor driven by the propulsion system.

3. The electronic device of claim 1, wherein the control system circuitry, to detect the audio characteristic feature, is configured to process the audio signal for detection of the modulation, determine a frequency of the modulation, and evaluate the frequency in relation to one or more predefined frequencies.

4. The electronic device of claim 1, wherein the property is a frequency of the modulation.

5. The electronic device of claim 1, which further comprises a communication unit for wireless data transmission, wherein the dedicated action comprises transmitting, by the communication unit, a wireless signal to represent one or more sensor data readings by the sensor arrangement.

6. The electronic device of claim 5, wherein the control system circuitry is configured to obtain sensor data from the sensor arrangement in accordance with a predefined schedule and store the sensor data in a memory, and wherein the dedicated action comprises retrieving at least a subset of stored sensor data in the memory and transmitting, by the communication unit, the wireless signal to represent said at least a subset of the stored sensor data.

7. The electronic device of claim 6, wherein control system circuitry is configured to select said at least a subset based on the audio characteristic feature.

8. The electronic device of claim 6, wherein the subset represents at least one sensor parameter among a plurality of sensor parameters that are detectable by the sensor arrangement.

9. The electronic device of claim 6, wherein the control system circuitry is configured to, if said at least a subset of stored sensor data is unavailable in the memory, transmit the wireless signal to indicate a lack of measurement data.

10. The electronic device of claim 5, wherein the control system circuitry is configured to start processing the audio signal for detection of the audio characteristic feature when a magnitude of the audio signal corresponds to sound waves received by the microphone from the propulsion system when the aerial vehicle is spaced from the electronic device by a predefined distance, wherein the predefined distance is less than a range of the wireless signal.

11. The electronic device of claim 1, wherein the dedicated action comprises obtaining a sensor data reading from the sensor arrangement.

12. The electronic device of claim 1, which is operable in at least a low-power state and a high-power state, wherein the control system circuitry is configured to set the electronic device in the high-power state upon said detection of the audio characteristic feature, and wherein the control system circuitry comprises a detector, which is operable to process the audio signal for detection of the audio characteristic feature while the electronic device is in the low-power state.

13. The electronic device of claim 12, wherein the detector comprises a pipeline of sub-units which are operated in sequence to detect the audio characteristic feature in the audio signal, wherein the pipeline comprises a first sub-unit, which is configured to process the audio signal for determination of a magnitude value and to selectively activate, based on the magnitude value, one or more further sub-units in the pipeline.

14. The electronic device of claim 13, wherein the one or more further sub-units comprise a second sub-unit, a third sub-unit, and a fourth sub unit, wherein the second sub-unit is configured to operate a bandpass filter on the audio signal to generate a filtered audio signal, the bandpass filter being configured to transmit the operating frequency, wherein the third sub-unit is configured to process the filtered audio signal to generate a time sequence of frequency values of a dominating frequency in the filtered audio signal, and wherein the fourth sub-unit is configured to process the time sequence of frequency values to determine a frequency of the modulation of the operating frequency.

15. An aerial vehicle, comprising:

a propulsion system;

a positioning system; and a control system circuitry, which is configured to operate the propulsion system to move the aerial vehicle along a flight path based on position data from the positioning system, wherein the control system circuitry is further configured to intermittently cause the propulsion system to impart a predefined and audible modification of an operating frequency of the propulsion system, wherein the predefined and audible modification is a predefined modulation of the operating frequency by a predefined modulation frequency, and wherein the control system circuitry is configured to cause the propulsion system to impart different modulations of the operating frequency to perform different dedicated actions at an electronic device depending on a property of an audio characteristic feature resulting from the predefined modulations.

16. The aerial vehicle of claim 15, further comprising a communication unit for wireless data communication, wherein the control system circuitry is configured to, after causing the propulsion system to impart the predefined and audible modification, operate the communication unit to listen for one or more data transmissions containing sensor data.

17. The aerial vehicle of claim 16, wherein the control system circuitry is configured to, if the one or more data transmissions are not received, modify the flight path.

18. A method of operating an electronic device, said method comprising:

processing an audio signal representing sound waves received by a microphone in the electronic device, to detect an audio characteristic feature originating from a propulsion system of an aerial vehicle; and performing, upon said detection, a dedicated action related to sensor data detectable by a sensor arrangement associated with the electronic device, wherein the audio characteristic feature is a predefined modulation of an operating frequency of the propulsion system of the aerial vehicle, and wherein different dedicated actions are performed depending on a property of the audio characteristic feature.

* * * * *